United States Patent [19]

Hsieh et al.

[11] Patent Number: 4,708,943

[45] Date of Patent: Nov. 24, 1987

[54] SILICON NITRIDE HAVING LOW DIELECTRIC CONSTANT

[75] Inventors: Martin Y. Hsieh, Palo Alto; Howard Mizuhara, Hillsborough, both of Calif.

[73] Assignee: GTE Products Corporation, Stamford, Conn.

[21] Appl. No.: 906,879

[22] Filed: Sep. 15, 1986

Related U.S. Application Data

[63] Continuation-in-part of Ser. No. 749,329, Jun. 27, 1985, Pat. No. 4,642,299, which is a continuation-in-part of Ser. No. 721,118, Apr. 8, 1985, Pat. No. 4,654,315.

[51] Int. Cl.$^4$ .................. C04B 35/58; H01Q 1/42
[52] U.S. Cl. ........................... 501/98; 501/97; 343/872
[58] Field of Search ............... 501/97, 98; 343/872

[56] References Cited

U.S. PATENT DOCUMENTS

| | | | |
|---|---|---|---|
| 4,025,351 | 5/1977 | Masaki | 501/98 |
| 4,147,911 | 4/1979 | Nishitani | 264/25 |
| 4,327,187 | 4/1982 | Komatsu et al. | 501/98 |
| 4,354,990 | 10/1982 | Martinengo et al. | 264/65 |
| 4,358,772 | 11/1982 | Leggett et al. | 343/872 |
| 4,376,652 | 3/1983 | Buljaw | 501/97 |
| 4,383,958 | 5/1983 | Moschetti et al. | 501/98 |
| 4,407,970 | 10/1983 | Komatsu et al. | 501/98 |
| 4,496,503 | 1/1985 | Ezis et al. | 264/56 |
| 4,511,402 | 4/1985 | Ezis et al. | 264/56 |
| 4,521,525 | 6/1985 | Hsieh | 501/97 |
| 4,542,072 | 9/1985 | Hsieh | 156/89 |
| 4,551,402 | 4/1985 | Miura et al. | 75/233 |
| 4,552,851 | 11/1985 | Hsieh | 501/98 |
| 4,642,299 | 2/1987 | Hsieh | 501/97 |

*Primary Examiner*—Mark L. Bell
*Attorney, Agent, or Firm*—J. Theodosopoulos

[57] ABSTRACT

A ceramic dielectric having a low dielectric constant and a low dielectric loss tangent from room temperature to at least about 1100° C. comprises a silicon nitride based material containing an effective amount of magnesium oxide as a sintering aid and an effective amount of a low dielectric loss promoter comprising iron oxide and/or chromium oxide.

2 Claims, No Drawings

SILICON NITRIDE HAVING LOW DIELECTRIC CONSTANT

This Application is a continuation-in-part of Ser. No. 749,329, filed 6/27/85, now U.S. Pat. No. 4,642,299, which is a continuation-in-part of Ser. No. 721,118, filed 4/8/85, now U.S. Pat. No. 4,654,315.

FIELD OF THE INVENTION

This invention relates to a silicon nitride composition having a low dielectric constant and a low dielectric loss over a wide temperature range. More particularly it relates to a silicon nitride material containing an effective amount of a sintering aid and an effective amount of a low dielectric loss promoter.

BACKGROUND OF THE INVENTION

In radome window applications of dielectric materials, it is desirable to have materials with the following dielectric oroperties: (a) low dielectric constant; (b) low dielectric loss; and (c) dielectric constant and loss tangent relatively independent of temperatures.

U.S. Pat. No. 4,358,772 states that for acceptable power transmission efficiency for radome materials, values of less than 10 and 0.01 are required for the dielectric constant and loss tangent respectively. That patent also indicates that ceramic materials such as silicon nitride, alumina, silica, cordierite, mullite and beryllia are suitable radome materials but none alone as a monolithic wall are suitable because none have the combination of a dielectric constant below 10 and a loss tangent of 0.01 and rain erosion and thermal stress resistance. That patent discloses a 5 layer composite consisting of 3 layers of silicon nitride alternating with 2 layers of fused silica. The silicon nitride is relatively pure silicon nitride having been vapor deposited from silicon tetrachloride and ammonia in a hydrogen atmosphere. The silicon nitride layers are disclosed to have a dielectric constant of 6 and a loss tangent of $9 \times 10^{-3}$.

Materials having excellent properties at high temperature such as thermal shock resistance, mechanical strength, etc., are more desirable for high temperature and/or high power window applications. Silicon nitride materials have high mechanical strength at room temperature and high temperatures, and also have excellent thermal shock resistance. However, it is difficult to sinter silicon nitride to high density without using sintering aids. Furthermore, sintering aids play a major role in the overall dielectric properties of silicon nitrides. Thus the development and discovery of low dielectric loss intergranular phases and/or modification of bulk crystalline properties are very important to obtain good dielectric materials. Usually the dielectric properties of silicon nitrides (hot pressed, reaction bonded and pressureless sintered) are dielectric constants ranging from abut 7.5 to about 9 and dielectric loss tangents higher than about 0.001, more particularly from about 0.002 to about 0.02. The dielectric loss tangent is usually highly dependent on temperature. Materials with high loss and adverse temperature dependent properties are not desirable for electromagnetic window applications. Silicon nitride type materials consisting essentially of silicon nitride and yttria and alumina as sintering aids are discussed in "Pressureless Sintered Silicon Nitride as a Promising Candidate for Radome Materials", 17th symposium on Electromagnetic Windows, Atlanta Ga., July 25-27, 1984, by M. Y. Hsieh, H. Mizuhara and P. W. Smith. These materials are designated in that article as SNW-1000. Those materials were shown to have properties suitable for high temperature radome applications. Materials which have even lower dielectric constant and lower loss tangent and remain essentially unchanged through the temperature range of from about 25° C. to about 1100° C. would be an advancement in the art.

SUMMARY OF THE INVENTION

In accordance with this invention, there is provided a ceramic dielectric having low dielectric constant and low dielectric loss tangent. The ceramic dielectric comprises a silicon nitride based material, an effective amount of a sintering aid, and an effective amount of a low dielectric loss promoter comprising iron oxide and/or chromium oxide.

More particularly, this invention provides a sintered silicon nitride based ceramic dielectric of at least 96% theoretical density comprising a sintering aid, a low dielectric loss promoter, balance silicon nitride and which consists of from about 2% by weight to about 10% by weight of magnesium oxide as the sintering aid, said weight being effective to achieve said theoretical density, said ceramic dielectric containing a low dielectric loss promoter at a level of from about 0.1% to about 2.0% by weight, said low dielectric loss promoter being selected from the group consisting of iron oxide and chromium oxide, said low dielectric loss promoter being effective to provide a low dielectric constant and a low loss tangent that remains essentially unchanged through the temperature range of from about 25° C. to about 1100° C., the dielectric constant being below about 7.0 at about 9.375 gigahertz throughout said temperature range, the loss tangent being less than about 0.003 throughout said temperature range.

DETAILED DESCRIPTION OF THE PRESENT INVENTION

For a better understanding of the present invention, together with other and further objects, advantages, and capabilities thereof, reference is made to the following disclosure and appended claims in connection with the foregoing description of some of the aspects of the invention.

The composition of this invention is a silicon nitride based material wherein a sintering aid is added in a sufficient quantity to achieve a sintered density of greater than about 96% of theoretical. High density samples of 99% or above of theoretical density are desirable in terms of evaluating the "true" dielectric properties. Porosity in samples will reduce the dielectric constant and dielectric loss tangent. This is the reason why some of the published data show low dielectric constants, compared with dense bodies. This gives a false impression of low dielectric constants of various materials including reaction bonded silicon nitride. Furthermore, high density samples have better mechanical strength, wearing properties and reliability.

The properties of a sintered body vary as sintering aids are reduced. Some trends are as follows: the density and dielectric constant drop, as do, generally, mechanical strength, hardness and wearing properties.

A suitable sintering aid is magnesium oxide, MgO. An amount of MgO sintering aid is used which will achieve a density of at least about 96% of theoretical. Such an amount is about 2 to 10% by weight.

The additive that is used as a low dielectric loss promoter is selected from the group consisting of iron oxide ($Fe_2O_3$) and chromium oxide ($Cr_2O_3$). Relatively small amounts, such as 0.05%, can be effective to reduce the dielectric loss tangent. However, it is generally preferred to use from about 0.1% to about 2% by weight.

Two samples were prepared by dry ball milling the appropriate amounts of materials in a Scott-Murray mill. Sample No. 1 contained 5 wt % MgO, .1 wt % $Fe_2O_3$, balance silicon nitride. Sample No. 2 contained 5 wt % MgO, 1 wt % $Cr_2O_3$, balance silicon nitride. About a 400 gram charge was used with about sixteen kilograms of silicon nitride 1" diameter grinding media. The materials were milled for about 36 hours. After milling, samples were prepared for testing by pressing into rectangular bars at about 20,000 psi. The bars were then sintered at about 1760° C. for about four hours in one atmosphere of nitrogen gas. The samples were above about 99% of theoretical density.

The following table shows the dielectric properties at 9.375 gigahertz and at four temperatures from 25° to 1100° C.

| Sample | Temperature, °C. | Dielectric Constant | Dielectric Loss Tangent |
| --- | --- | --- | --- |
| 1 | 25 | 6.80 | 0.0008 |
|   | 400 | 6.80 | 0.0009 |
|   | 800 | 6.82 | 0.0009 |
|   | 1100 | 6.86 | 0.0010 |
| 2 | 25 | 6.70 | 0.0009 |
|   | 400 | 6.70 | 0.0009 |
|   | 800 | 6.74 | 0.001 |
|   | 1100 | 6.79 | 0.001 |

The dielectric properties are relatively independent of the amount of low dielectric loss promoter in the range of about 0.05 to 2 wt %. It can be seen that the samples varied less than 2% in dielectric constant over the wide temperature range from ambient to 1100° C. Such a low variation is especially desirable in high power electromagnetic window applications.

We claim:

1. A sintered silicon nitride based ceramic dielectric of at least 96% theoretical density comprising a sintering aid, a low dielectric loss promoter, balance silicon nitride and which consists of from about 2% by weight to about 10% by weight of magnesium oxide as the sintering aid, said weight being effective to achieve said theoretical density, said ceramic dielectric containing a low dielectric loss promoter at a level of from about 0.1% to about 2.0% by weight, said low dielectric loss promoter being selected from the group consisting of iron oxide and chromium oxide, said low dielectric loss promoter being effective to provide a low dielectric constant and a low loss tangent that remains essentially unchanged through the temperature range of from about 25° C. to about 1100° C., the dielectric constant being below about 7.0 at about 9.375 gigahertz throughout said temperature range, the loss tangent being less than about 0.003 throughout said temperature range.

2. A radome window of a dielectric material comprising a sintered silicon nitride based ceramic dielectric of at least 96% theoretical density comprising a sintering aid, a low dielectric loss promoter, balance silicon nitride and which consists of from about 2% by weight to about 10% by weight of magnesium oxide as the sintering aid, said weight being effective to achieve said theoretical density, said ceramic dielectric containing a low dielectric loss promoter at a level of from about 0.1% to about 2.0% by weight, said low dielectric loss promoter being selected from the group consisting of iron oxide and chromium oxide, said low dielectric loss promoter being effective to provide a low dielectric constant and a low loss tangent that remains essentially unchanged through the temperature range of from about 25° C. to about 1100° C., the dielectric constant being about 7.0 at about 9.375 gigahertz throughout said temperature range, the loss tangent being less than about 0.003 throughout said temperature range.

* * * * *